T. FAWCUS.
SHAFT COUPLING.
APPLICATION FILED JULY 22, 1911.
1,096,162.
Patented May 12, 1914.
2 SHEETS—SHEET 2.
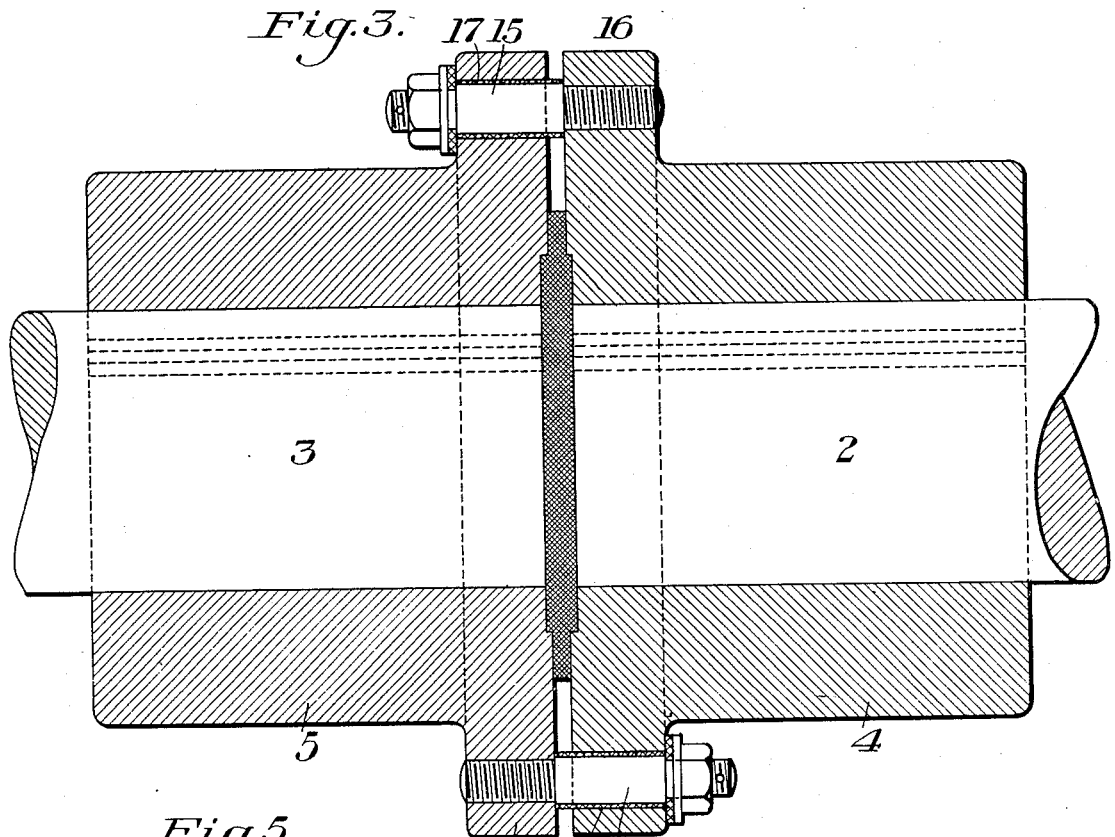
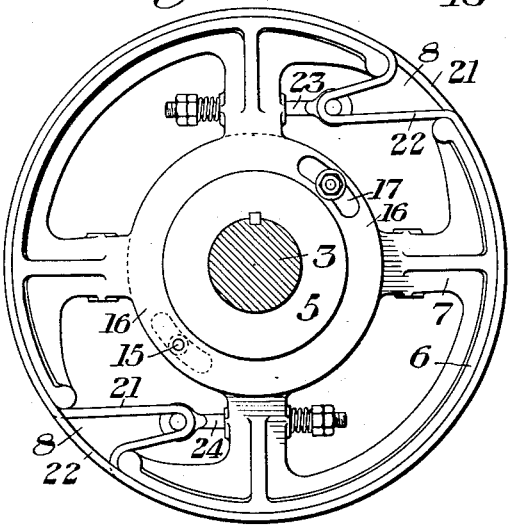
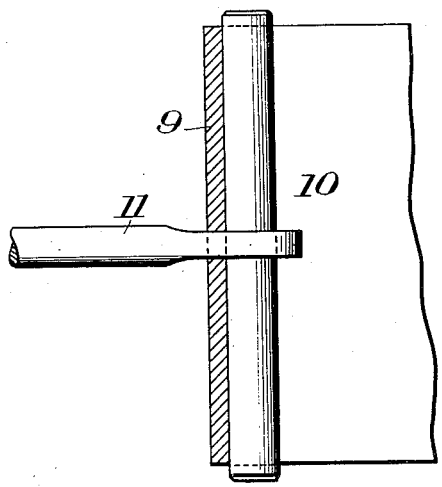
WITNESSES
INVENTOR

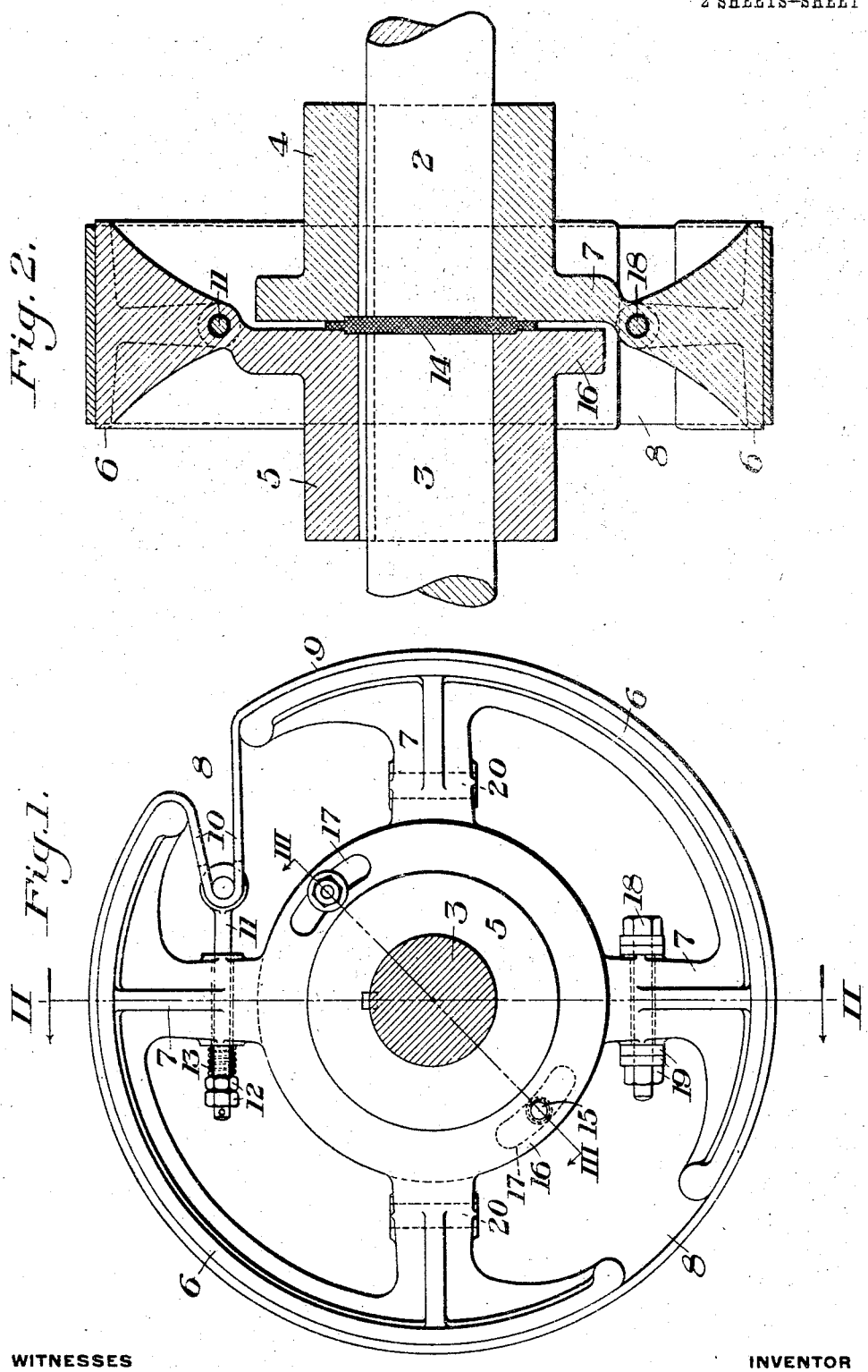

UNITED STATES PATENT OFFICE.

THOMAS FAWCUS, OF PITTSBURGH, PENNSYLVANIA.

SHAFT-COUPLING.

1,096,162.  Specification of Letters Patent.  Patented May 12, 1914.

Application filed July 22, 1911. Serial No. 640,004.

*To all whom it may concern:*

Be it known that I, THOMAS FAWCUS, a resident of Pittsburgh, in the county of Allegheny and State of Pennsylvania, have invented a new and useful Improvement in Shaft-Couplings, of which the following is a full, clear, and exact description, reference being had to the accompanying drawings, forming part of this specification, in which—

Figure 1 is an end view of a shaft coupling embodying my invention; Fig. 2 is a section on the line II—II of Fig. 1; Fig. 3 is a section on the line III—III of Fig. 1; Fig. 4 is a detail view; and Fig. 5 is a view similar to Fig. 1, but on a smaller scale and showing a modification.

My invention has relation to shaft couplings, and is designed to provide a coupling of improved character for the purpose of connecting a driving member with a driven member in a manner to permit the two members to be slightly out of line with each other, and which at the same time, constitutes a flexible shock-absorbing and positive driving connection between the two members.

My invention also provides a coupling of this character in which the two members may be readily insulated from each other if desired; which is simple in its construction; and which can be readily repaired.

Referring to the accompanying drawings, in which I have shown the preferred embodiment of my invention, the numeral 2 indicates a driving shaft and the numeral 3 a driven shaft. In practice, however, either of the two shafts may be the driven shaft and the other the driver.

4 and 5 designate the hub portions of two similar castings, the hub portion 4 being keyed or otherwise rigidly secured to the shaft member 2, and the hub portion 5 being similarly secured to the shaft member 3. Each of these castings has projecting from its hub a substantially semicircular rim portion 6, connected to the hub by any desired number of radial arms 7. These rim portions are offset with respect to the hub portions, in such a manner that when the two castings are applied to the respective shaft members in the manner shown, the two rim portions will form approximately a complete circle, their ends, however, being separated by spaces or openings at 8.

9 designates an endless belt which is passed around the circular pulley formed by the rim portions of the castings, and has a loop 10, passing inwardly through one of the openings 8 and engaging the belt tightener 11. This tightener may be of any suitable form. It is shown as consisting of a bolt passing loosely through an opening in one of the arms 7 and carrying jam nuts 12, at its rear end. A spring 13 is seated between these jam nuts and the adjacent side of the arm 7.

14 designates a disk of fiber or other suitable material which is interposed between the ends of the shaft members 2 and 3 and which also extends partially between the adjacent faces of the hub portions 4 and 5. This fiber disk answers the double purpose of assisting to keep the two shafts in line and also to insulate them.

It frequently happens that a shaft such as an electric motor armature shaft, is permitted to "float", that is, end play is allowed. In such cases, I prefer to provide insulated studs or bolts 15. One of these studs is preferably screwed in the flange 16 of one hub portion and passes through an elongated slot 17 in a similar flange of the other hub portion, the two bolts or studs being placed reversely, as shown in Fig. 3. These studs do not bolt the two castings together, but merely prevent their being drawn away from each other. The two castings are perfectly free to rotate relatively to each other to the extent permitted by the slots 17.

In order to counterbalance the belt tightener above described, I preferably provide the diametrically opposite arm 7 with a stud or bolt 18, carrying counterweights 19.

I preferably provide each of the arms 7 with an opening 20, therethrough, so that the bolt tightener and counterweighted bolt or stud may be applied to any desired pair of these arms and diametrically opposite to each other.

The modification shown in Fig. 5 is adapted to be used where the shafts are required to reverse. The construction of the coupling itself is the same as first described, but two bolts 21 and 22 are used side by side, and the two tighteners 23 and 24 are oppositely arranged, so that they balance each other and no counter weighting is required.

My invention provides an extremely simple and efficient shaft coupling. The previously existing couplings of this general type of which I am aware are of three different classes, one class using leather links, another using rubber buffers or bushings, and a third using laced belts. The objection to couplings of the first class is that the links stretch unevenly and after being in use a short time, it is found that the load is being carried by comparatively few links, the result being that the latter soon break. Couplings of the class using rubber are unsatisfactory, because rubber is not sufficiently durable and soon becomes inoperative. The couplings of the laced belt type are probably the best, but the construction is expensive and complicated and difficult to keep in repair.

My invention provides a device in which the entire load is carried on one belt which can be readily adjusted to the proper tension, both before and after stretching has taken place. A further and important advantage is the ease with which it can be repaired by the millwright, who usually has such things in charge in rolling mills and other manufacturing plants. All that is required in case of breakage of the belt is to take a new piece and join it up, and this the millwright is accustomed to do for other machines about the plant.

I do not wish to limit myself to the exact form of construction and arrangement of the parts here shown and described, since it will be obvious that the invention is susceptible to modifications in detail, without departing from the spirit and scope of my invention as defined in the appended claims. Thus, various forms of belt tighteners may be employed in lieu of those shown and described, the form of the castings constituting the coupling may be changed, and various other minor changes may be made.

I claim:

1. A shaft coupling comprising a driving member and a driven member, and coupling members; one coupling member being secured to the driving member and the other to the driven member and consisting each of a hub portion and an approximately semicircular rim portion, the two rim portions being placed opposite to each other and forming an approximately complete circular pulley, together with an endless flexible belt passing around said pulley and means for drawing the belt into frictional contact with the pulley, the belt being disconnected from the periphery of the pulley and free to move thereon, substantially as described.

2. A shaft coupling comprising two symmetrical castings adapted to be secured respectively to driving and driven shafts, said castings having oppositely-located rim portions adapted to form when assembled a substantially circular pulley, an endless flexible belt passing around said pulley, the belt being disconnected from the periphery of the pulley and free to move thereon, and a belt tightener device engaging a loop of the belt, substantially as described.

3. A shaft coupling comprising two symmetrical castings adapted to be secured respectively to driving and driven shafts, said castings having oppositely-located rim portions adapted to form when assembled a substantially circular pulley, an endless flexible belt passing around said pulley, the belt being disconnected from the periphery of the pulley and free to move thereon, and a belt tightener device engaging a loop of the belt, together with means for counterbalancing the tightener device, substantially as described.

4. A shaft coupling comprising a driven member and a driving member adapted to be respectively secured to a driven shaft and a driving shaft, and comprising a hub portion and an offset rim portion, the two rim portions forming a substantially circular pulley, a flexible endless belt passing around said pulley and forming the driving connection, means for tightening said belt, said belt being capable of a slipping movement on the peripheral surface of the pulley, means for insulating the two members from each other, and means for permitting a limited independent rotary movement of one member with respect to the other, substantially as described.

5. A shaft coupling comprising two symmetrical castings adapted to be secured respectively to driving and driven shafts, said castings having rim portions adapted to form when assembled a substantially circular pulley, an endless flexible belt passing around said pulley, the belt being disconnected from the periphery of the pulley and free to move thereon, and a belt tightener device engaging a loop of the belt, substantially as described.

In testimony whereof, I have hereunto set my hand.

THOMAS FAWCUS.

Witnesses:
H. M. CORWIN,
GEORGE H. PARMELEE.